United States Patent
Brome et al.

(10) Patent No.: US 7,428,456 B2
(45) Date of Patent: Sep. 23, 2008

(54) ACTIVE COMBINE ROTOR DECELERATION

(75) Inventors: John G. Brome, Delavan, WI (US); Douglas L. Wolken, Burr Ridge, IL (US); Nicholas J. Laufenberg, Darien, IL (US)

(73) Assignee: CNH America LLC, New Holland, PA (US)

( * ) Notice: Subject to any disclaimer, the term of this patent is extended or adjusted under 35 U.S.C. 154(b) by 143 days.

(21) Appl. No.: 11/474,853

(22) Filed: Jun. 26, 2006

(65) Prior Publication Data
US 2006/0240883 A1 Oct. 26, 2006

Related U.S. Application Data

(62) Division of application No. 11/051,770, filed on Feb. 4, 2005, now Pat. No. 7,186,201.

(51) Int. Cl.
*G06F 7/70* (2006.01)
*G06F 19/00* (2006.01)
*G06G 7/00* (2006.01)
*G06G 7/76* (2006.01)

(52) U.S. Cl. .......................... 701/50; 475/72

(58) Field of Classification Search .................. 701/50; 475/72, 78, 79, 80, 81, 82, 83, 275, 269, 475/303, 239, 254, 1; 460/59, 6, 119; 56/10.8, 56/10.2 R, 10.3
See application file for complete search history.

(56) References Cited

U.S. PATENT DOCUMENTS

| | | | |
|---|---|---|---|
| 4,348,855 A | 9/1982 | DePauw et al. | |
| 4,893,241 A | 1/1990 | Girodat et al. | |
| 5,865,700 A * | 2/1999 | Horsch | 475/72 |
| 5,873,227 A * | 2/1999 | Arner | 56/14.6 |
| 5,947,818 A | 9/1999 | Satzler | |
| 6,167,685 B1 | 1/2001 | Berger et al. | |
| 6,247,295 B1 * | 6/2001 | Hansen et al. | 56/10.2 A |
| 6,513,311 B1 | 2/2003 | Berger et al. | |
| 6,663,525 B1 * | 12/2003 | McKee et al. | 475/72 |
| 6,681,551 B1 * | 1/2004 | Sheidler et al. | 56/10.2 G |
| 6,695,693 B2 | 2/2004 | Ho et al. | |
| 6,702,666 B2 | 3/2004 | Ho et al. | |
| 6,726,560 B2 | 4/2004 | Ho et al. | |
| 6,734,647 B2 | 5/2004 | Wakitani et al. | |
| 2004/0014509 A1 | 1/2004 | Brome et al. | |
| 2004/0018864 A1 * | 1/2004 | Ho et al. | 460/59 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A system and method for actively decelerating a combine rotor is provided. The system includes an electronic control system configured to disengage the combine rotor from an engine, to brake the combine rotor at a first deceleration rate for a first time interval, and to subsequently brake the combine rotor at another deceleration rate until the rotor is stopped.

12 Claims, 5 Drawing Sheets

ACTIVE COMBINE ROTOR DECELERATION

CROSS-REFERENCE TO RELATED APPLICATIONS

The present application is related to U.S. patent application Ser. No. 10/166,951, now issued as U.S. Pat. No. 6,695,693; to U.S. patent application Ser. No. 10/166,916, now issued as U.S. Pat. No. 6,702,666; to co-pending U.S. patent application 10/167,310 from which this application claims priority as a continuation-in-part application; to co-pending U.S. patent application Ser. No. 10/199,681 from which this application also claims priority as a continuation-in-part application, and to U.S. patent application 11/051,770 from which this application claims priority as a divisional application filed Feb. 4, 2005, now U.S. Pat. No. 7,186,201.

FIELD OF THE INVENTION

The invention relates to agricultural combines and systems for controlling their operation. More particularly, it relates to control systems for controlling the speed of combine rotors. Even more particularly, it relates to control systems rapidly braking combine rotors to complete stop.

BACKGROUND OF THE INVENTION

Agricultural combines or "combine harvesters" are well-known for harvesting crops such as corn, soybeans, and wheat. The typical combine includes a self-propelled chassis supported on the ground via driving and driven wheels. A replaceable harvesting head is mounted on the front of the chassis for harvesting the crop of interest. The combine is operable to feed the harvested grain from the head to an internal threshing and separating system that separates the grain from stalks, pods, cobs, etc. (collectively referred to herein as "chaff") and that transfers the grain to an on-board storage hopper. The stored grain can be periodically transferred to a wagon or the like by an auger mounted on the chassis adjacent the storage hopper.

So-called "split-torque" or "hydro-mechanical" transmissions have been proposed to address these and other problems encountered when driving a threshing rotor. U.S. Pat. Nos. 6,695,693 and 6,702,666 to Ho, Brome, and Bundy describe a combine in which an engine simultaneously drives the rotor through two power paths: (1) the engine drives a hydraulic pump, which drives a motor which drives the sun gear of a planetary gear set and (2) the engine drives a gear train which drives an engine-to-ring clutch which drives the ring gear of the planetary gear set.

The two paths are joined at a planetary gear box. The engine drives the ring gear. The motor drives the sun gear. The ring gear and sun gear drive the planetary gears. The planetary gears, in turn, drive the rotor.

One problem with these arrangements, however, is the failure of the rotor to slow down and stop rapidly when the engine-to-ring clutch is disengaged. At the end of a harvesting cycle, the operator manipulates an operator control in the operator's compartment such as a switch that causes the rotor electronic control system to uncouple (disengage) both the engine and motor from the rotor. When this happens, the rotor preferably coasts down from its operating speed of (typically) 250-1200 rpm to a complete stop.

Depending upon the internal friction in the system, the rotor may take a considerable amount of time, as much as several minutes, to slow to a halt. If the internal friction is insignificant, the rotor may indeed never stop rotating until the engine is turned off. Instead, the rotor may slowly rotate at a slow speed (30-100 rpm) until the operator is forced to shut off the engine.

This slow rotation is caused by fluid friction in the engine-to-ring clutch. The rotor control system disengages the engine-to-ring clutch when the operator turns the rotor off and thus there is no plate-to-plate contact. Nonetheless, the plates of the clutch are spaced closely enough to each other that the fluid in the clutch alone is enough to cause the engine to rotate the rotor very slowly.

When the operator shuts off the combine rotor, the operator expects it to stop promptly. When the rotor slows down to 30-100 rpm and keeps rotating indefinitely, the only choice the operator has is to shut off the engine and wait for the rotor to coast to a complete stop. Starting and stopping the engine causes unnecessary wear on a variety of components in the combine.

What is needed, therefore, is an improved method for decelerating and stopping the rotor of the combine. It is an object of this invention to provide such a method and apparatus.

SUMMARY OF THE INVENTION

In accordance with a first aspect of the invention a method of decelerating a combine rotor driven by an engine is provided, the method comprising the steps of disengaging the combine rotor from an engine; braking the combine rotor at a first deceleration rate for a first time interval; braking the combine rotor at a second deceleration rate for a second time interval; and stopping the combine rotor at the end of the second time interval.

The first deceleration rate may be generally constant throughout the first time interval and the second deceleration rate may be greater than the first deceleration rate. The step of the braking the combine rotor at a first deceleration rate for a first time interval may include the steps of periodically electronically reading the first deceleration rate, and responsively adjusting brake engagement to maintain the first deceleration rate generally constant. The step of responsively adjusting brake engagement may include the step of varying a PWM duty cycle of a current applied to a ring gear brake. The step of braking the combine rotor at a first deceleration rate may include the step of braking the combine rotor at the first deceleration rate based upon the combine rotor reaching a first threshold speed. The step of braking the combine rotor at a second deceleration rate may include the step of braking the combine rotor at the second deceleration rate based upon the combine rotor reaching a second threshold speed.

In accordance with a second aspect of the invention a system for decelerating a combine rotor driven by an engine is provided, the system including a first speed sensor configured to indicate the speed of the combine rotor, and a digital microprocessor-based control system coupled to the first speed sensor and programmed to disengage the combine rotor from the engine, to brake the combine rotor at a first deceleration rate for a first time interval, to brake the combine rotor at a second deceleration rate for a second time interval, and to stop the combine rotor at the end of the second time interval.

The control system may be programmed to maintain the first deceleration rate generally constant throughout the first time interval, and the second deceleration rate is greater than the first deceleration rate. The control system may be programmed to periodically read the first speed sensor to determine the first deceleration rate, and to maintain the first deceleration rate generally constant by responsively adjusting brake engagement. The control system may be programmed to maintain the first deceleration rate generally constant by varying a PWM duty cycle of a current applied to a ring gear brake. The control system may be programmed to brake the combine rotor at the first deceleration rate based upon the combine rotor reaching a first threshold speed. The control system may be programmed to brake the combine rotor at the second deceleration rate based upon the combine rotor reaching a second threshold speed.

In accordance with a third aspect of the invention, a system for decelerating a combine rotor driven by an engine is provided, the system including first means for sensing rotor speed; and second means for disengaging the combine rotor from the engine, for braking the combine rotor at a first deceleration rate for a first time interval, for braking the combine rotor at a second deceleration rate for a second time interval, and for stopping the combine rotor at the end of the second time interval.

The second means may include means for maintaining the first deceleration rate generally constant throughout the first time interval, and the second deceleration rate is greater than the first deceleration rate. The second means may include means for periodically reading the first speed sensor to determine the first deceleration rate, and means for maintaining the first deceleration rate generally constant by responsively adjusting brake engagement.

The second means may include means for maintaining the first deceleration rate generally constant by varying a PWM duty cycle of a current applied to a ring gear brake. The second means may include means for braking the combine rotor at the first deceleration rate based upon the combine rotor reaching a first threshold speed. The second means may include means for braking the combine rotor at the second deceleration rate based upon the combine rotor reaching a second threshold speed.

The second means may include means for braking the combine rotor with a brake at the first deceleration rate while simultaneously dissipating energy in the brake at less than the brake's maximum energy dissipation rate. The second means may include means for braking the combine rotor with a brake at the second deceleration rate while simultaneously dissipating energy in the brake at less than the brake's maximum energy dissipation rate.

The system may further include a brake disposed to decelerate the rotor, and the second means may include means for applying an initial electrical current to the brake, the initial current being less than a threshold current that will initiate rotor deceleration. The system may further include a brake disposed to decelerate the rotor, and the second means may include means for reducing braking force of the brake when the rotor decelerates at more than the first deceleration rate during the first time interval and for reducing braking force of the brake when the rotor decelerates at more than the second deceleration rate during the second time interval.

These and other aspects of the invention will become apparent upon examination of the following figures and detailed description of the preferred embodiments.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
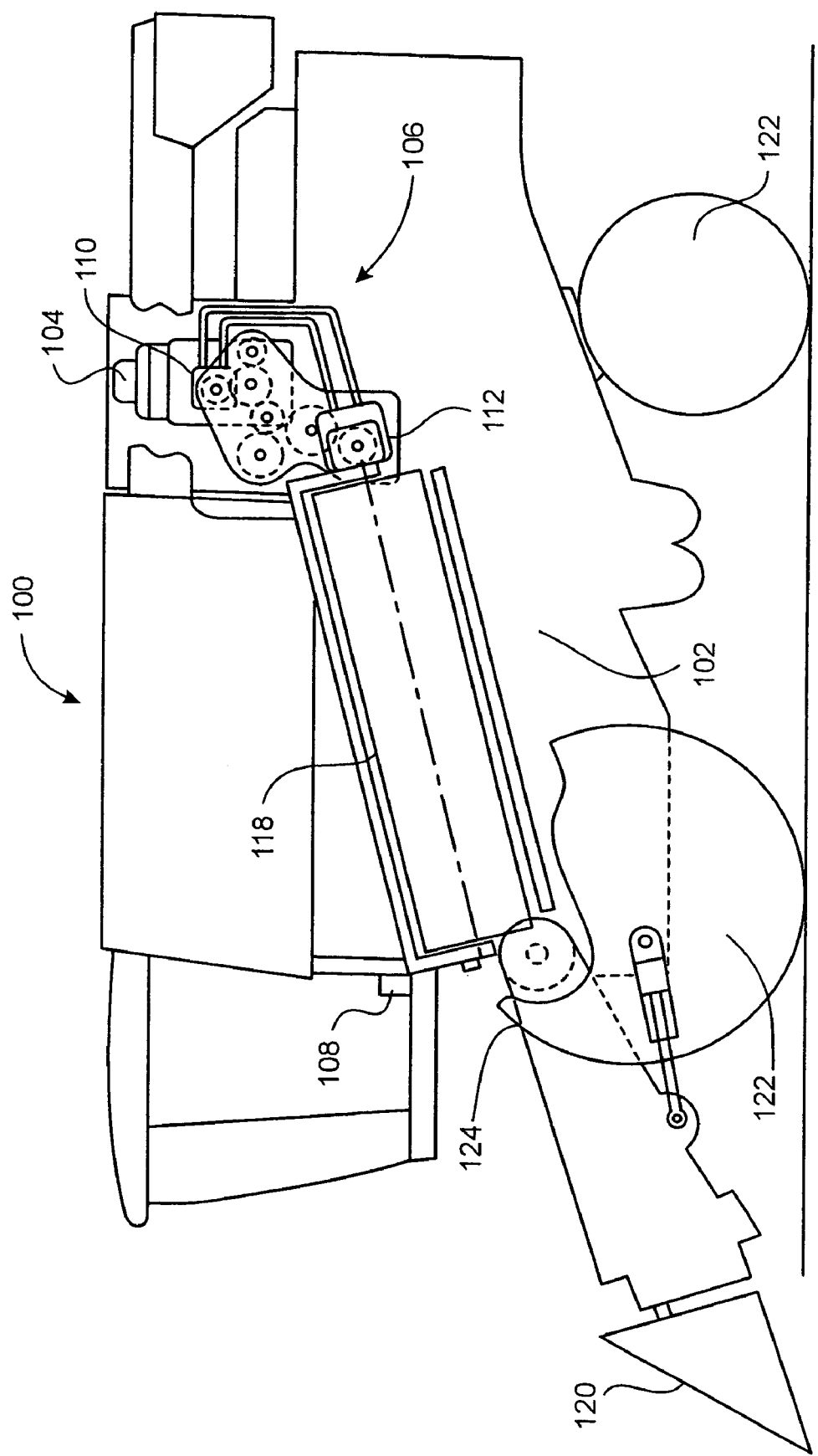
FIG. 1 is a side schematic view of an agricultural combine having a rotor drive system in accordance with the present invention.
Figure 2:
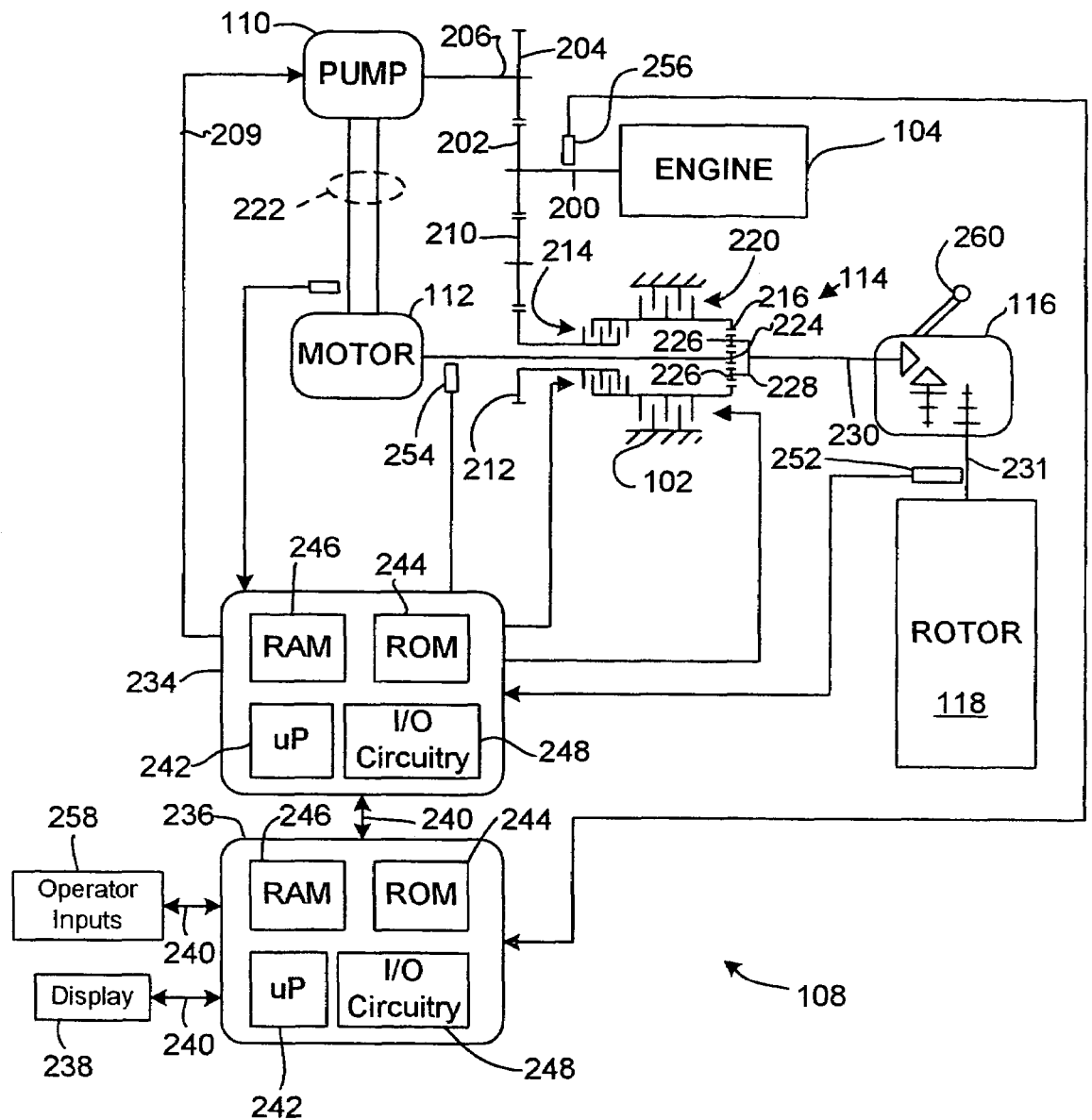
FIG. 2 is an electrical, hydraulic and mechanical schematic diagram of the rotor drive system of FIG. 1 showing the electronic control system that controls its operation.

Referring to FIGS. 1 and 2, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, gear trains coupling engine 104 to the pump, engine 104 to a planetary gear arrangement, the planetary gear arrangement itself, and a gearbox driven by the planetary gear arrangement that, in turn, drives the combine rotor 118.

Rotor 118 rotates with respect to chassis 102 and threshes agricultural material, such as corn or wheat. A header 120 is coupled to the front of the combine chassis to gather the agricultural material from the field and direct it into the rotor. The agricultural material is gathered by the header and cut. Once cut it falls into a header trough that includes an auger. The auger drives the agricultural material toward the mouth of the feeder, which gathers the material and transfers the material to the rotor, which then receives and threshes it.

Several wheels 122 are coupled to the chassis to engage the ground and support the combine as it travels over the ground. One or more hydraulic motors (not shown) are coupled to the wheels to drive the wheels in rotation, thereby driving the combine over the ground.

FIG. 2 illustrates construction details of the work vehicle (and particularly the rotor drive system) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under computer control. In particular, pump 110 has internal electronic actuators that vary the specific displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114.

When clutch 214 is engaged, engine 104 is coupled to and drives ring gear 216. When clutch 214 is disengaged, engine 104 is disconnected from ring gear 216. Engine-to-ring clutch 214 engages engine 104 not only to ring gear 216, but also to motor 112 and rotor 118. When clutch 214 is disengaged, and ring-to-frame clutch 220 is also disengaged, the engine, the motor, and the rotor all turn freely with respect to each other. Engaging ring-to-frame clutch 220 couples motor 112 to rotor 118. Engaging engine to ring clutch 214 engages the engine, the motor, and the rotor to one another to mutually drive (or be driven by) each other.

A second brake or clutch 220 (a ring-to-frame clutch) is coupled to and between ring gear 216 and the frame or chassis 102 (indicated by the ground symbol) to fix the ring gear with respect to the chassis or frame of the vehicle and keep it from rotating. If the ring gear is rotating when clutch 220 is engaged, clutch 220 brakes the ring gear by slowing it down. When clutch 220 is engaged 100%, ring gear 216 is fixed and cannot rotate.

Clutches 214 and 220 are preferably "wet" multiplate clutches that the system engages by filling them with hydraulic fluid under pressure. The hydraulic fluid under pressure acts against a piston portion of the clutch which presses against a stack of wet plates. These plates engage each other when pressed together and permit torque to be transmitted from the input to the output of the clutch. The clutches are actuated by conventional hydraulic valves (not shown) that alternately conduct hydraulic fluid under pressure to the clutches to engage them, and release hydraulic fluid in the clutches back to a hydraulic fluid tank or reservoir (not shown) to disengage them. The valves themselves are actuated by electrical signals provided to an electrical valve coil or solenoid of the valves. These electrical signals are provided by the electronic controllers in the system.

In the preferred embodiment, clutch 220 can be selectively engaged to varying degrees by varying the amount of electrical current that flows through the solenoid coil of the hydraulic valves that operate the clutch.

Electronic controller 234 is configured to pulse-width modulate the electrical current signal it applies to the valve of clutch 220. Controller 234 varies the "on" time or duration of the current signal it applies to the clutch valve, and thereby varies the amount of clutch engagement and hence the drag on the ring gear. To increase the drag on the ring gear and slow the ring gear down faster, controller 234 increases the PWM duty cycle of the current signal applied to clutch 220.

Pump 110 is hydraulically connected to motor 112 by hydraulic conduits 222. These conduits conduct fluid to and from motor 112 to form a closed loop hydraulic (hydrostatic) drive circuit.

Motor 112 is coupled to and drives sun gear 224 of planetary gear arrangement 114. Sun gear 224 drives planet gears 226, which drive planetary gear carrier 228.

Gearbox 116 is a multi-speed gearbox having three manually selectable gear ratios. Gearbox 116 has an input shaft 230, and an output shaft 231. Gearbox 116 is shiftable by manual manipulation of gearshift lever 260 to alternatively select one of the three gear ratios.

Input shaft 230 of gearbox 116 is fixed to and rotates together with planetary gear carrier 228. The output shaft 231 of multi-speed gearbox 116 is coupled to and drives rotor 118.

It should be clear that power from engine 104 to rotor 118 follows two parallel paths. The first path is from engine 104, though the gearing, through clutch 214, through planet gears 226 and into shaft 230. The second parallel path is from engine 104, through pump 110, through motor 112, through sun gear 224, through the planet gear 226 and into shaft 230.

In a normal mode of operation, power through both paths is provided to the rotor. Engine 104 operates most efficiently at a set and predetermined rpm, yet the rotor cannot be operated at a set, predetermined speed, but must be variable over some range or ranges of speed to operate efficiently in harvesting the several types of crops it is intended and designed to do.

To provide this variable rotor speed, the parallel power path from engine 104 through pump 110 and motor 112 to the sun gear is provided. The planetary gear arrangement permits power through both paths to be applied to the rotor. The motor drives the sun gear, the engine drives the ring gear. The planetary gear carrier is coupled to and driven by both the sun and ring gears and applies that combined power to the rotor through gearbox 116.

The rotor speed is not varied by varying the engine speed and the ring gear speed, which are constant. The rotor speed is generally varied by controller 234 which varies the motor speed. Controller 234 accomplishes this by varying the specific displacement of pump 110.

Electronics

An electronic control system 108, including three digital controller circuits and their associated sensors, controls the operation of the foregoing machine elements.

The system 108 includes a first digital microprocessor-based controller 234, a second digital microprocessor-based controller 236 and a third digital microprocessor-based controller 238 that are coupled together over a serial communications network, here shown as a CAN bus 240 that operates in accordance with the SAE J1939 communications standard.

Each controller 234, 236, and 238 are similarly constructed, and include a microprocessor circuit 242, a read-only memory (ROM) circuit 244, a random access memory (RAM) circuit 246 and an input/output (I/O) circuit 248. The ROM stores a computer program that directs the operation of the controller. The RAM is temporary storage space for numeric values used in computation, and the I/O circuit is configured to process and condition external communication signals including communications with the sensors and the other controllers on the CAN bus 240. These four circuits are connected to one another using a data/address/control bus of standard design, which is not shown. Can bus 240 couples the three controllers together.

The first digital controller 234 is connected to two speed sensors: a rotor speed sensor 252, and a motor speed sensor 254. These sensors are coupled to rotor 118 and motor 112 to sense their respective rotational speeds and to transmit signals indicative of those speeds to controller 234.

The speed sensors in the present system preferably generate a series (or "stream") of pulses as the devices to which they are coupled rotate. The faster the engine, rotor and motor turn, the faster the respective engine rotor and motor sensors generate streams of pulses. These pulse streams are provided to I/O circuits 248 of controllers 234 and 236, to which the sensors are coupled.

Common sensor arrangements that generate such pulse sequences include Hall effect devices and inductive pickups that sense the passage of slotted disks mounted on the shafts of the engine, rotor and motor. These are the preferred sensor arrangements for sensors 252, 254, and 256.

Controller 234 is also connected to and controls three other devices: pump 110, engine-to-ring clutch 214 and ring-to-frame clutch 220. Controller 234 generates and transmits a signal indicative of a desired specific pump displacement to pump 110 over electrical signal lines 209. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of controller 236 is connected to an engine speed sensor 256 and to operator input device 258. Engine speed sensor 256, like sensors 252, 254 generates a speed signal typically in the form of a pulse train. Operator input device 258 includes a switch the operator can manipulate to signal controller 236 to stop the rotor. Controller 236 is also connected to controller 234 and controller 238 via the CAN bus.

The third and final controller, controller 238, is a display controller. It is constructed the same as controller 234 and 236, but is dedicated to displaying data generated by the operator or the other controllers. This capability is provided by its own internal control program stored in its ROM memory. It includes a display device such as an LCD or electroluminescent display. It is coupled to the other controllers over CAN bus 240.

Programming

Controllers 234, 236, and 238 include internal digital control programs that control their operation, and hence the operation of the whole electronic control system 108. These programs are stored in the ROM memory of each controller. The specific operations performed by these controllers to accelerate the rotor from a dead stop to an operating speed and to keep the rotor rotating at the proper speed are discussed in U.S. Pat. Nos. 6,695,693 and 6,702,666, which are incorporated herein by reference for all that they teach. This basic operation will not be repeated herein.

Figure 3:
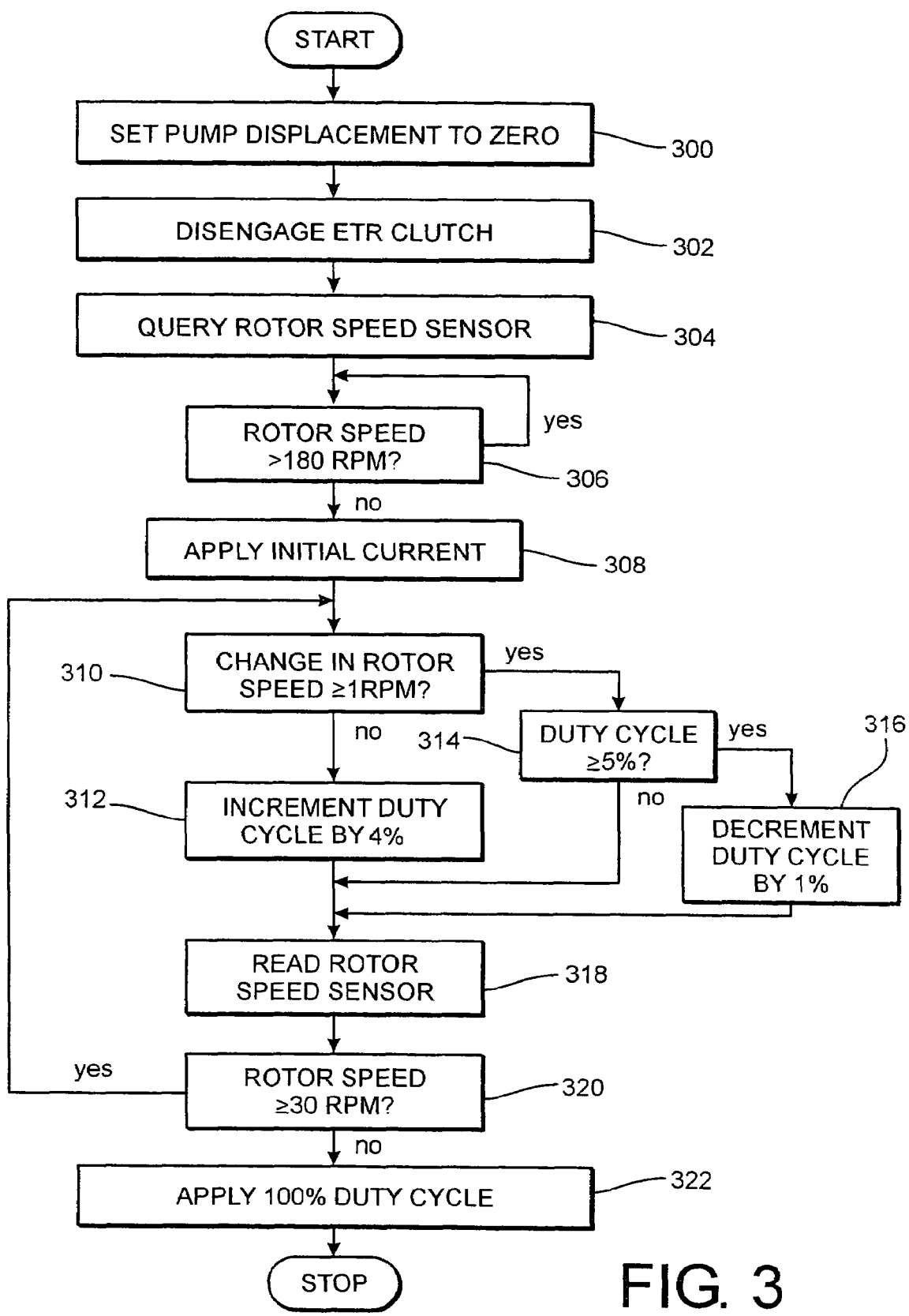
FIG. 3 is a flow chart illustrating the operation of the electronic control system, and particularly controller 234 when slowing the rotor to a stop.

The process of stopping the rotor is illustrated in FIG. 3, which is a flow chart of the basic steps performed by the control system, and particularly by controller 234 when it stops the rotor. Controller 234 does not stop the rotor by physically contacting the rotor directly. Instead, controller 234 engages clutch 220, which helps slow and eventually stops the ring gear. Controller 234 also stops the rotation of the motor. Since the motor (hence the sun gear) is stopped during the entire deceleration process, the rotor rotates only as long as the ring gear rotates and in direct proportion to the speed of the ring gear. By stopping the ring gear, controller 234 stops the rotor.

To begin the process of stopping the rotor, the operator manipulates operator input device 258 to generate a stop command. Operator input device 258 responsively signals controller 234. Controller 234 stops the rotor.

In step 300, controller 234, responsively transmits a signal to pump 110 commanding it to change its specific displacement to zero. This prevents pump 110 from sending hydraulic fluid to or from motor 112. Motor 112 stops.

In step 302, controller 234 transmits a signal to engine-to-ring clutch 214, commanding it to disengage, and thereby breaking the connection between the engine and the ring gear. With the ring gear disconnected and the motor stopped, the rotor is disconnected from any power source and begins coasting. Friction begins to slow the rotor down. Since the engine still drives the input to engine-to-ring clutch 214 even after clutch 214 is disengaged, the engine may transmit some residual torque to the ring gear as the rotor slows down. This residual torque is a function of the fluid coupling between the input and the output of the engine-to-ring clutch 214.

In step 304, controller 234 queries the rotor speed sensor to determine how fast the rotor is going.

In step 306, controller 234 determines whether or not the rotor is going faster than a predetermined speed. In the preferred embodiment, the predetermined speed is between 100 and 200 rpm, preferably between 150 and 190 rpm, and more preferably between 160 and 180 rpm.

If controller 234 determines that the rotor is going faster than the predetermined speed (shown as 180 rpm in FIG. 3), processing loops back to step 304. Thus, controller 234 waits until the rotor has reached the first predetermined speed before it brakes the rotor.

Once controller 234 determines that the rotor has reached the predetermined speed or is less than the predetermined speed in step 306, processing continues at step 308. In step 308, controller 234 applies an initial braking current to the hydraulic valve controlling ring-to-frame clutch 220. This causes the hydraulic valve to open and ring-to-frame clutch 220 to engage accordingly.

Controller 234 pulse width modulates the current to clutch 220 to be "on" for an initial duty cycle of 4% (of 10 ms pulse duration in a 250 ms pulse cycle) in step 308. When the current is "on", it engages clutch 220, which locks the ring to the frame of the combine. The greater the "on" duty cycle, the tighter clutch 220 locks up and the more it tends to slow down the ring gear.

In step 310, controller 234 examines sequential rotor speed signals read from the rotor speed sensor to determine the deceleration rate of the rotor, and whether the rotor has decreased in speed by a predetermined amount over a predetermined time interval. In the preferred embodiment, the predetermined decrease in speed is one revolution per minute and the predetermined time interval is 250 ms. This is equivalent to a 4 rpm per second reduction in rotor speed.

If controller 234 determines that the rotor is slowing down (decelerating) at less than 1 rpm per 250 ms (4 rpm/sec) in step 310, controller 234 proceeds to step 312 and increments the duty cycle of the current applied to clutch 220 by a predetermined amount. In the preferred embodiment this preferred amount is 0.4% or 1.0 ms in every 250 ms period. By incrementing the duty cycle of the current applied to clutch 220, controller 234 engages clutch 220 more, which causes clutch 220 to slow the ring gear down faster. By slowing the ring gear down faster, the speed of the ring gear decreases more quickly. After incrementing the duty cycle, controller 234 continues processing at step 318.

On the other hand, if controller 234 determines that the rotor is slowing down at 1 rpm per 250 ms or more in step 310, controller 234 proceeds to step 314 and determines whether the present duty cycle is at least a predetermined threshold duty cycle. In the preferred embodiment, this threshold is a duty cycle of 5% (13 ms divided by 250 ms). This threshold duty cycle is selected to be just below the engagement threshold of clutch 220.

If the present duty cycle is at least the predetermined threshold duty cycle, controller 234 continues to step 316 and decrements the "on" time of the current applied to clutch 220 by 3 ms (approximately 1% duty cycle). The process then continues processing at step 318.

On the other hand, if the present duty cycle is less than the predetermined threshold duty cycle, controller 234 continues processing at step 318.

In step 318, controller 234 again reads the rotor speed sensor to determine the current speed of the rotor. Having read the sensor, controller 234 continues to step 320 in which controller 234 compares the just-measured rotor speed with a second threshold rotor speed. In the preferred embodiment, the second threshold rotor speed is preferably between 20 and 40 rpm, and more preferably is between 25 and 35 rpm. Most preferably it is 30 rpm.

If controller 234 determines that the rotor speed is greater than or equal to the second threshold rotor speed in step 320, controller 234 continues processing at step 310, discussed above.

Alternatively, if controller 234 determines that the rotor speed is less than the second threshold rotor speed in step 320, controller 234 continues processing at step 322

In step 322, controller 234 applies current to the control valve for clutch 220 at a 100% duty cycle. In other words, it completely engages clutch 220. In response, the ring gear rapidly slows to a stop, typically going from 30 rpm to a full stop in less than 10 seconds.

When the rotor is disengaged, controller 234 is configured to periodically monitor the speed of the rotor using rotor speed sensor 252, checking the rotor speed every 10 ms.

Figure 4:
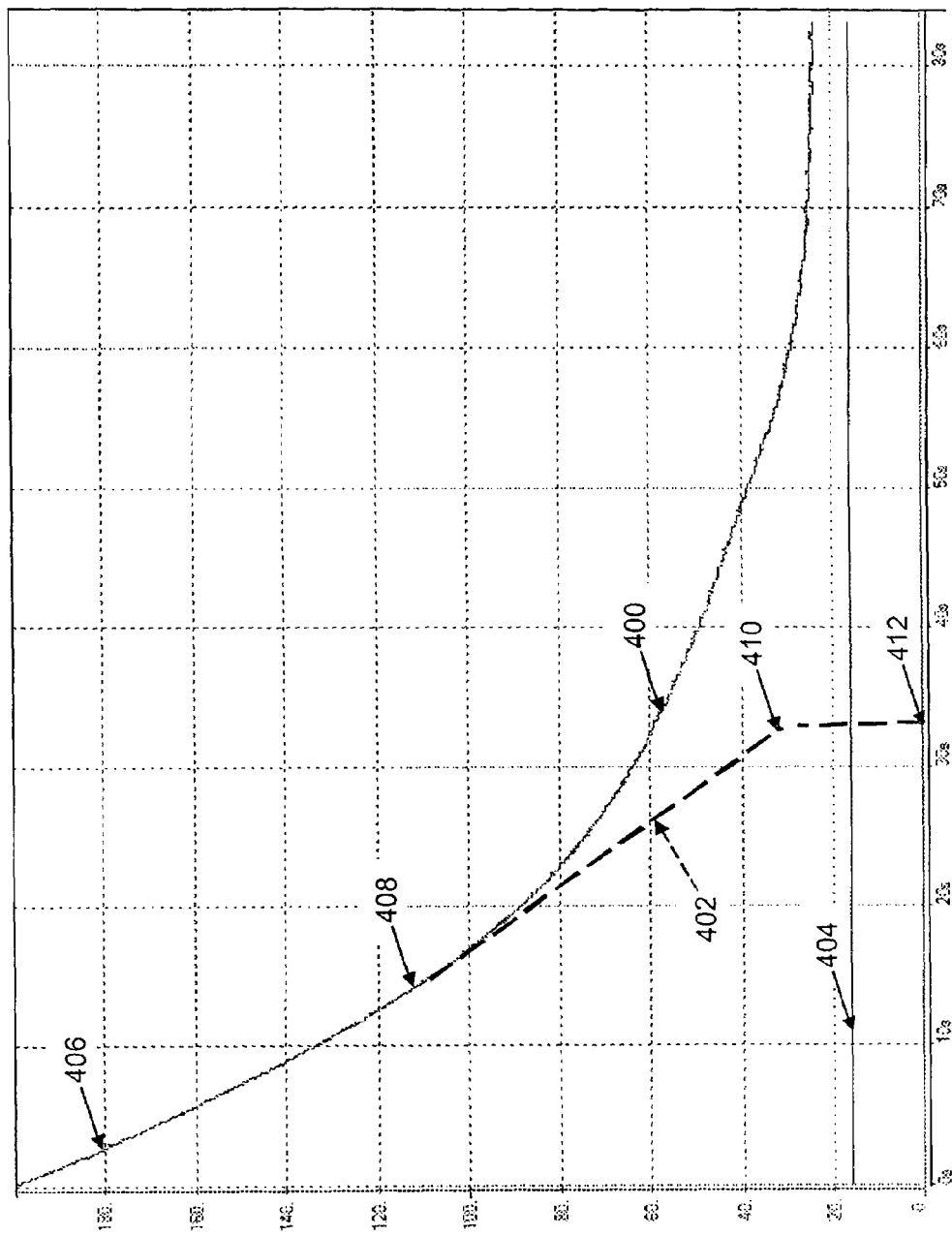
FIG. 4 is a graph showing (1) a typical passive rotor deceleration curve indicating how the rotor slows to a steady state speed when no braking is provided and (2) illustrating how the rotor decelerates when it is actively slowed by braking.

FIG. 4 illustrates this process of actively controlling the combine drive system to decelerate the rotor. FIG. 4 illustrates several curves, including (1) curve 400, which represents the speed versus time function of the rotor when it is permitted to decelerate naturally (i.e. without being decelerated by clutch 220); (2) curve 402, which illustrates the speed versus time function of the rotor when it is actively decelerated according to the method illustrated in FIG. 3; (3) and line 404, which represents a speed of about 18 rpm, which the rotor approaches as a constant terminal speed without active braking by clutch 220. The speed of 18 rpm is used as a typical example. The value of the terminal speed will vary depending upon the construction of the various components their age, friction effects, the temperature of the hydraulic fluid and a host of other factors.

Referring now to FIG. 4, curve 400, the natural speed deceleration curve of the rotor is generally in the form of a decaying exponential. Initially, the rotor decelerates rapidly with the speed dropping by 60 rpm in less than 10 seconds. As the rotor slows down, however, there is less friction acting on the rotor and the rate at which the speed drops get smaller and smaller. Finally, when the rotor has decelerated for over a minute, the rotor approaches a steady state speed of about 18 rpm, which is shown as line 404 in FIG. 4. Once the rotor reaches that speed, it will stay there indefinitely, driven by residual fluid torque transfer in the engine-to-ring clutch.

In contrast to this, curve 402 illustrates the speed versus time function of the rotor when it is actively braked by clutch 220. The rotor first decelerates to 180 rpm (point 406) at which time controller 234 determines that the rotor speed is less than 180 rpm (step 306) and applies the initial 4% duty cycle current (step 308) to clutch 220.

At a rotor speed of 180 rpm, however, the rotor speed is decreasing faster than 4 rpm per minute. Controller 234 therefore does not increase or decrease the duty cycle from its initial 4% duty cycle set in step 308. By the time the rotor decelerates to about 120 rpm, however, the rotor's rate of deceleration has slowed to slightly less than 4 rpm per minute. The rotor reaches this 4 rpm per minute deceleration rate at point 408 on curve 402.

Once the rotor drops to this deceleration rate, controller 234 begins incrementing and decrementing the duty cycle of the current supplied to the clutch 220 valve as necessary. Controller 234 keeps the deceleration rate as close to 4 rpm per second (1 RPM every 250 ms) as possible.

The effect of this constant deceleration rate can be seen by the divergence of the curve 402 from curve 400 in FIG. 4. Due to the active braking provided by clutch 220, the rotor follows curve 402, decelerating in an almost straight line at a constant rate of 4 rpm per minute until it reaches a speed of 30 rpm. This is shown as point 410 on curve 402.

Once the rotor reaches a speed of 30 rpm (step 320) controller 234 applies current with a duty cycle of 100% to clutch 220 and locks up the ring gear. The ring gear (and hence the rotor) rapidly decelerates to a complete stop within less than a second during this second stage of deceleration. The rotor stops after less than 20 seconds of active deceleration.

The deceleration rates are preferably selected to maximize the energy dissipation in clutch 220. Clutches cannot dissipate an infinite amount of energy. As the clutch drags on the rotor, the rotor's kinetic energy is converted to heat in the clutch plates and heat in the hydraulic fluid surrounding and cooling the clutch plates. All clutches can be characterized by their maximum energy dissipation rate—the rate at which they are able to convert the rotor's kinetic energy to heat and to dissipate that heat without being damaged. The clutch can be damaged if the clutch is engaged too hard for too long in an attempt to dissipate rotor energy at a higher rate than this, in order to slow the rotor down faster. To ensure that the clutch is not damaged, one must maintain the rate at which the clutch dissipates energy at a level below the maximum energy dissipation rate.

The kinetic energy in the rotor that must be dissipated to bring a rotor to a stop equals ½ mv*2. The rate at which the rotor's kinetic energy is naturally dissipated by friction between the various drive components and wind resistance is represented as curve 400. The area between the curve 402 and curve 400 represents the additional energy dissipated in the clutch bringing the rotor to a stop.

In order to decelerate the rotor without damaging the clutch, the rotor should be decelerated in a series of stages that ensure the clutch does not dissipate energy at more than its maximum energy dissipation rate, in the present example, best shown in FIG. 4, the rotor is decelerated in two stages, a first stage in which the rotor decelerates at a constant rate of 4 rpm per second, and a second stage in which the rotor decelerates at a rate of 30-50 rpm per second. The first stage of deceleration is represented by the portion of curve 402 that extends between point 408 and point 410. The second stage of deceleration is represented by the portion of curve 402 that extends between point 410 and point 412, a dead stop.

Figure 5:
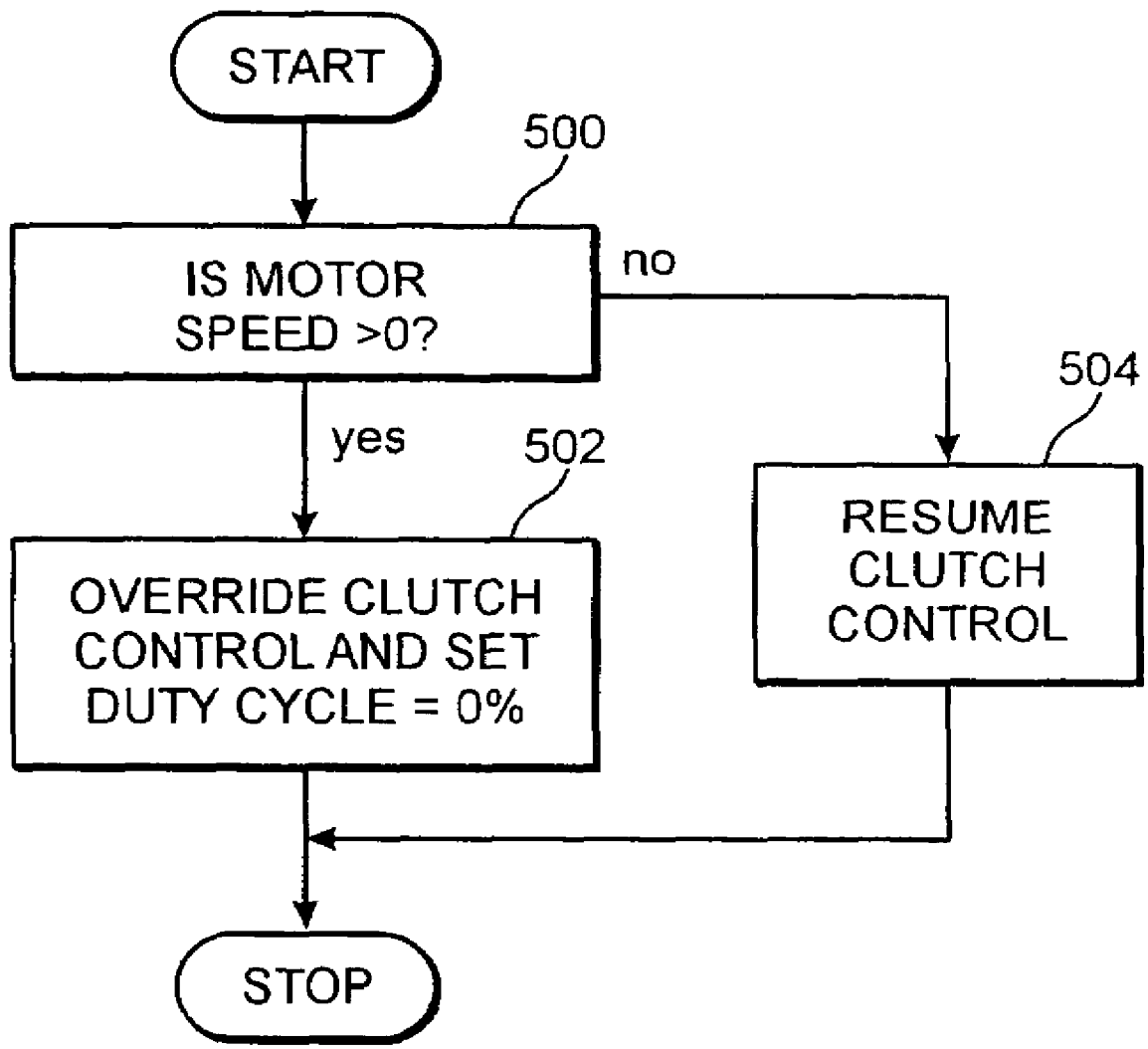
FIG. 5 is a flow chart illustrating the operation of the electronic control system, and particularly the steps performed by controller 234 every millisecond to check the motor speed sensor and see if the motor is turning.

FIG. 5 illustrates another precaution that the system takes to ensure that the rotor is decelerated smoothly. FIG. 5 illustrates the steps taken by controller 234 as it monitors the motor speed sensor every 1 ms during the entire deceleration process shown in FIG. 4 to make sure the deceleration process is not occurring too fast. If clutch 220 is engaged too fast, it will grab the ring gear and slow it down extremely rapidly. When this happens, a very high torque is generated in the planetary gears. This high torque causes the sun gear to start rotating and pressure relief valves (not shown) to open in the hydraulic lines between the pump and the motor.

To prevent this too-rapid deceleration, controller 234 is configured to repeatedly execute the steps shown in FIG. 5 every millisecond. In particular, controller 234 reads the motor speed sensor every millisecond (step 500) and disengages the clutch 220 by setting the clutch valve solenoid duty cycle to 0% if the rotor speed sensor indicates that the motor speed is greater than zero (step 502). Setting the duty cycle equal to zero overrides the clutch control (i.e. the gradual clutch engagement and braking operations) performed by controller 234 and illustrated in FIG. 3. This permits the ring gear to turn freely and reduces the torque applied to the sun gear.

Controller 234 checks the motor speed (step 500) every 1 ms, with the clutch duty cycle set to zero until the motor speed again returns to zero. Once the motor speed returns to zero in step 500, controller 234 resumes the clutch control steps shown in FIG. 3, again setting the clutch duty cycle to the percentage calculated in steps 310-322.

In sum, controller 234 is configured to sense any movement of the sun gear by monitoring the signal provided by the motor speed sensor and is configured to release clutch 220 (which is acting as a break for the ring gear and rotor) whenever it senses this movement. Controller 234 releases the clutch by reducing the duty cycle to zero and thereby interrupting all current to the clutch valve coil of clutch 220. Controller 234 is configured to resume the deceleration process shown in FIG. 4 as soon as the sun gear stops rotating.

The two stages selected in the preferred embodiment—a first stage deceleration rate of 1 rpm per 250 ms (i.e. 4 rpm per second) and a second stage deceleration rate of 30-50 rpm per second—ensure that the particular clutch selected for this application is able to dissipate the rotor's energy at a rate less than the clutch's maximum energy dissipation rate.

In some applications, however, it may be desirable to decelerate the rotor even faster. To do this, controller 234 can be programmed to provide additional stages of deceleration that define additional inflection points on the deceleration curve 402 and therefore additional line segments of curve 402 having different slopes (which corresponds to different deceleration rates). By providing additional deceleration stages with different deceleration rates, controller 234 can ensure that clutch 220 is dissipating energy as fast as possible without damage, thereby slowing the rotor down as fast as possible.

It will be obvious to those skilled in the art that various changes may be made without departing from the scope of the invention and the invention is not considered to be limited to what is illustrated in the drawings and described in the specification.

For example, the application discussed and illustrated above shows a two-stage deceleration, with a first stage decelerating at a generally constant rate of four rpm per second and a second stage decelerating at a generally constant rate of 30 rpm per second. In an alternative configuration, one or more additional or intermediate stages could be configured to provide three or more deceleration rates. These rates are preferably calculated to dissipate the maximum amount of energy in the clutch throughout the entire deceleration cycle.

We claim:

1. A system for decelerating a combine rotor driven by an engine, the system comprising:
   a first speed sensor configured to indicate the speed of the combine rotor;
   a digital microprocessor-based control system coupled to the first speed sensor and programmed to disengage the combine rotor from the engine, to brake the combine rotor at a first deceleration rate for a first time interval, to brake the combine rotor at a second deceleration rate for a second time interval, and to stop the combine rotor at the end of the second time interval, wherein the control system is programmed to periodically read the first speed sensor signal, determine the first deceleration rate based on the first speed sensor signal, and to maintain the first deceleration rate generally constant by responsively adjusting brake engagement; and
   a ring gear brake controlled by the control system, wherein the control system is programmed to maintain the first deceleration rate generally constant by varying a pulse width modulation duty cycle of a current applied to the ring gear brake.

2. The system of claim 1, wherein the control system is programmed to maintain the first deceleration rate generally constant throughout the first time interval, and further wherein the second deceleration rate is greater than the first deceleration rate.

3. The system of claim 1, wherein the control system is programmed to brake the combine rotor at the first deceleration rate once the combine rotor reaches a first threshold speed.

4. The system of claim 3, wherein the control system is programmed to brake the combine rotor at the second deceleration rate once the combine rotor reaches a second threshold speed.

5. A system for decelerating a combine rotor driven by an engine, the system comprising:
   first means for sensing rotor speed; and
   second means for disengaging the combine rotor from the engine, for braking the combine rotor at a first deceleration rate for a first time interval, for braking the combine rotor at a second deceleration rate for a second time interval, and for stopping the combine rotor at the end of the second time interval, wherein the second means is coupled to the first means to sense the rotor speed, wherein the second means includes means for periodically reading the first speed sensor to determine the first deceleration rate, and means for maintaining the first deceleration rate generally constant by responsively adjusting brake engagement, wherein the second means includes means for maintaining the first deceleration rate generally constant by varying a pulse width modulation duty cycle of a current applied to a ring gear brake.

6. The system of claim 5, wherein the second means includes means for maintaining the first deceleration rate generally constant throughout the first time interval, and further wherein the second deceleration rate is greater than the first deceleration rate.

7. The system of claim 5, wherein the second means includes means for braking the combine rotor at the first deceleration rate based upon the combine rotor reaching a first threshold speed.

8. The system of claim 7, wherein second means includes means for braking the combine rotor at the second deceleration rate based upon the combine rotor reaching a second threshold speed.

9. The system of claim 5, wherein the second means includes means for braking the combine rotor with a brake at the first deceleration rate while simultaneously dissipating energy in the brake at less than the brake's maximum energy dissipation rate.

10. The system of claim 5, wherein the second means includes means for braking the combine rotor with a brake at the second deceleration rate while simultaneously dissipating energy in the brake at less than the brake's maximum energy dissipation rate.

11. The system of claim 5, further comprising a brake disposed to decelerate the rotor, and further wherein the second means includes means for applying an initial electrical current to the brake, the initial current being less than a threshold current that will initiate rotor deceleration.

12. The system of claim 5, further comprising a brake disposed to decelerate the rotor, and further wherein the second means includes means for reducing braking force of the brake when the rotor decelerates at more than the first deceleration rate during the first time interval and for reducing braking force of the brake when the rotor decelerates at more than the second deceleration rate during the second time interval.

* * * * *